United States Patent [19]

Van Auken

[11] 4,281,921

[45] Aug. 4, 1981

[54] PLURAL COLOR ANTI-COPYING SYSTEMS FOR XEROGRAPHIC AND ELECTROSTATIC COPYING MACHINES

[76] Inventor: John A. Van Auken, 16 La Gorce Cir., Miami Beach, Fla. 33141

[21] Appl. No.: 76,225

[22] Filed: Sep. 17, 1979

[51] Int. Cl.[3] .......... G03B 27/32

[52] U.S. Cl. .......... 355/77; 355/133

[58] Field of Search .......... 355/77, 132, 133

[56] References Cited

U.S. PATENT DOCUMENTS

| | | | |
|---|---|---|---|
| 3,852,088 | 12/1974 | Godlewski et al. | 355/133 X |
| 3,887,742 | 6/1975 | Reinnagel | 355/133 X |
| 4,118,122 | 10/1978 | Rees et al. | 355/133 X |

*Primary Examiner*—Richard A. Wintercorn
*Attorney, Agent, or Firm*—LeBlanc, Nolan, Shur & Nies

[57] ABSTRACT

An anti-copying system or method of coloring an original document with pre-selected background and image colors which, in combination, inhibit or prevent intelligible reproduction on xerographic and electrostatic copying machines.

16 Claims, 1 Drawing Figure

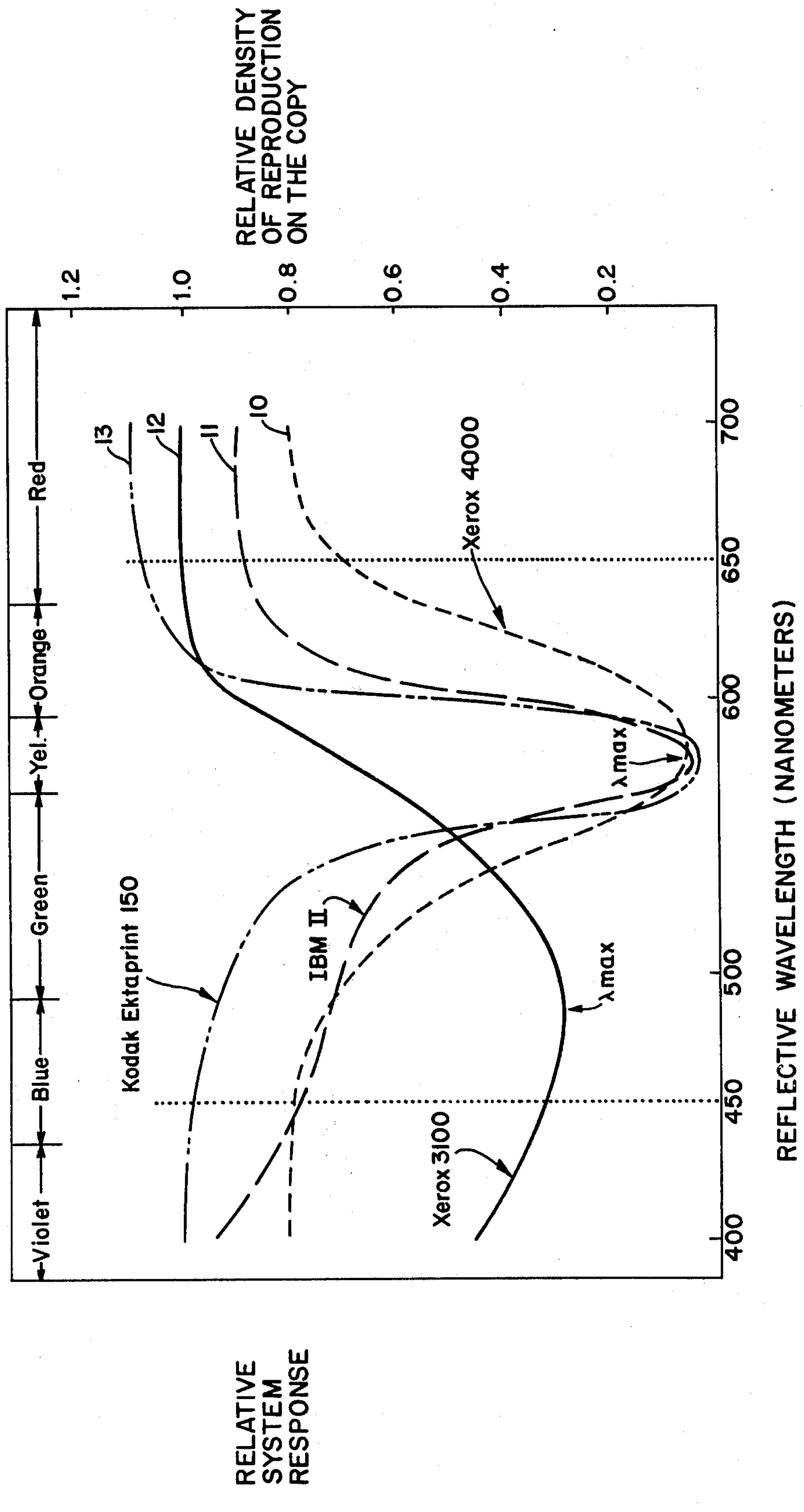
RELATIVE DENSITY OF REPRODUCTION ON THE COPY
RELATIVE SYSTEM RESPONSE
REFLECTIVE WAVELENGTH (NANOMETERS)
1.2
1.0
0.8
0.6
0.4
0.2
400
450
500
550
600
650
700
Violet
Blue
Green
Yel.
Orange
Red
Kodak Ektaprint 150
IBM II
Xerox 3100
Xerox 4000
λmax
λmax
10
11
12
13

PLURAL COLOR ANTI-COPYING SYSTEMS FOR XEROGRAPHIC AND ELECTROSTATIC COPYING MACHINES

FIELD OF INVENTION

This invention relates to anti-copying systems wherein original documents are produced in colors selected to inhibit or prevent intelligible reproduction on xerographic and/or electrostatic copying machines.

BACKGROUND

Because of the availability of xerographic and electrostatic office copying machines, the ease with which they can be operated, and the low cost of copying, there has been, in recent years, widespread unauthorized and indiscriminate copying of documents. Unauthorized copying of copyrighted works, such as musical scores and text material, is of particular concern because it violates the legal rights of authors and publishers.

Representative teachings addressing the foregoing problem along with other related prior art are found in U.S. Pat. No. 3,852,088 issued on Dec. 3, 1974, U.S. Pat. No. 3,887,742 which issued on June 3, 1975, U.S. Pat. No. 3,603,681 issued on Sept. 7, 1971, U.S. Pat. No. 3,807,852 issued on Apr. 30, 1974, U.S. Pat. No. 3,713,861 issued Jan. 30, 1973, U.S. Pat. No. 3,671,451 issued on June 20, 1972, U.S. Pat. No. 776,470 issued on Nov. 29, 1904, U.S. Pat. No. 776,515 issued on Dec. 6, 1904, U.S. Pat. No. 17,473 issued on Jan. 2, 1957, U.S. Pat. No. 4,025,673 issued on May 24, 1977, U.S. Pat. No. 3,597,082 issued on Aug. 3, 1971, U.S. Pat. No. 3,977,785 issued on Aug. 31, 1976, U.S. Pat. No. 1,692,405 issued on Nov. 20, 1928, Swiss Pat. No. 109,040, French Pat. No. 809,379, British Pat. No. 402,028, British Pat. No. 411,178, and British Pat. No. 198,364.

Most of the solutions proposed in the foregoing patents contemplate a special form of document which is intended to impair or prevent ligible reproduction. Such solutions, in general, are unsatisfactory mainly because they favor just one type or one small class of copying machines or photoreceptors over others, or are costly, or both. Accordingly, no optimum solution has been found for economically defeating all or most of the different types of popular copying machines presently in commercial use.

For the most part, present day plain paper copying machines (i.e., those utilizing plain copy paper) use one of four different photoconductor or photoreceptor materials with varying mixtures of color sensitizers. Such photoconductor materials are selenium as employed in some Xerox machines, zinc oxide as employed in Royal or Royfax machines, cadmium sulfide as employed in Saxon machines and organic (e.g., polyvinyl carbazole) materials as used in IBM machines. None of the known anti-copying document color systems is capable of adquately preventing the production of intelligible copy of all four classes of photoconductor materials just mentioned.

SUMMARY AND OBJECTS OF INVENTION

In the development of this invention it was found that the different types of photoconductors mentioned above respond in varying degrees to selected colors and that the overall or system spectral responses of different copying machines employing such photoconductor materials each depend upon the spectral response of the photoreceptor or photoconductor material itself along with the spectral energy distribution of the copier's light source. Furthermore, it was found that there is a certain relationship between the system spectral responses for copiers using the different photoconductors mentioned above.

As an example, copying machines equipped with one type of photoconductor or photoreceptor material are capable of recognizing blue, thereby copying it strongly, while at the same time failing to recognize yellow and therefore failing to copy yellow. On the other hand, copying machines employing another type of photoconductor material mentioned above are capable of copying yellow well, but not blue.

The plural color anti-copying system of this invention is designed to utilize the various color responses of the different photoconductor materials mentioned above for inhibiting or preventing the reproduction of intelligible copy. For example, printing a blue, light green or yellow-green image on a yellow background will inhibit satisfactory reproduction of copies on machines using those photoreceptors which respond well to yellow, but which respond weakly to blue or green. In attempting to copy such a plural colored original, the background color on the original will "print up" in the copy and thus will be strong or dense while the image color will "print down" and thus will be faded. The resultant copy will therefore lack contrast, making it unreadable or unintelligible.

In order to economically defeat a larger group of copying machines using different photoconductor materials the present invention contemplates a triple-color anti-copying system in which different parts of the image or text on the original are printed in two different colors on a background of a third color. For example, the background color of the original may advantageously be selected to print up on most copying machines. One image color is selected to print down on some copying machines while printing up on other copying machines. The other image color is selected to have the reverse effect of the first image color mentioned above, printing up on some copier while printing down on other copying machines. The dual coloring for the image or text can be arranged in such a way that alternate paragraphs of a text are printed in the two different colors. With this triple-color system the resultant copy tends to drop one set of paragraphs on one group of copiers and a different set of paragraphs on another group of copiers.

Rather than utilizing a dual color system in which one color prints up and the other color prints down, the present invention also contemplates an anti-copying color system in which both colors are selected to print up to approximately the same density level on the copy for certain photoreceptors, thus removing the image-background contrast on the copy to make it unintelligible.

With the foregoing in mind the general aim and purpose of this invention is to provide a novel plural color anti-copying system or method for economically making documents copy resistant on a large group of xerographic and electrostatic copying machines using different photoconductor materials.

Another object of this invention is to provide an anti-copying method of coloring an original document with contrasting image and background colors which, in combination, inhibit or prevent intelligible reproduction on such office copiers as xerographic copying machines.

Still another important object of this invention is to provide a novel plural-color anti-copying system or method in which different parts of an image or text on the original document are printed in different colors on a background of a third color, the colors being so selected that one part of the image or text drops out in the resultant copy on a first group of copying machines while another part of the image or text drops out in the resultant copy on a second group of copying machines.

Further objects of this invention will appear as the description proceeds in connection with the below-described drawing and appended claims.

DESCRIPTION OF DRAWING

The single FIGURE in the drawing is a graph containing a family of response or sensitivity curves showing the relative system or overall spectral responses for various popular copying machines currently in commercial use.

DEFINITIONS

The terms "image" and "graphical information" are interchangeably used herein to include words, letters, numerals, graphics, drawings, illustrations, or any indicia that can be imprinted on a sheet of paper or other material. The term "original" or more specifically "original document" is used herein to embrace any document to be copied, whether it be the true original or a colored copy or reproduction thereof. As applied to colors, the expression "dominant wavelength" signifies the maximum reflectance value of a given color. Only copying machines producing uncolored copies are considered, such uncolored copies being in shades of gray, white or near white and black or near black.

DETAILED DESCRIPTION

Referring to the drawing, the illustrated graph contains four system spectral response or sensitivity curves 10, 11, 12 and 13 for various popular copying machines currently in commercial use.

Each of the curves 10–13 is a plot of reflected light wavelength in nanometers (i.e., light reflected from the original to be copied) versus the relative print density of the reproduction (image or background) on the copy. The relative density is therefore a measure of the relative reflectance of light from the original at a given wavelength.

As such, the relative density of curves 10–13 represents the relative spectral system responses of the copying machines associated with curves 10–13 over a wavelength range or region extending from approximately 400 nanometers to 700 nanometers. The colors associated with the various wavelength bands or regions for the 400 to 700 nanometer range are shown at the top of the graph.

For convenience the dominant wavelength or maximum reflection for the major colors are set forth in Table I below:

TABLE I

| Color | Dominant Wavelength (nm) |
|---|---|
| Violet | 410 |
| Blue | 465 |
| Green | 530 |
| Yellow-green | 555 |
| Yellow | 580 |
| Orange | 615 |
| Red | 690 |

System response curve 10 is for a Xerox 4000 copying machine having a selenium-tellurium alloy photoreceptor, system response curve 11 is for an IBM II copying machine having a polyvinyl carbazola photoreceptor, system response curve 12 is for a Xerox 3100 copying machine having a selenium photoreceptor, and system response curve 13 is for a Kodak Ektaprint 150 copying machine having an organic photoreceptor. Each of these curves thus shows the variation of relative density and hence relative reflectance over the wavelength range mentioned above.

The relative system spectral response curve illustrated in the drawing for each of the copying machines mentioned above was experimentally determined and represents a combination of chiefly two responses, namely the relative spectral response of the photoconductor material utilized in the copying machine and the relative spectral energy distribution or output of the light source used in the copying machine.

In analyzing the illustrated system responses, it will be observed that the maximum reflectance (λmax) for the Xerox 4000, Kodak and IBM machines (curves 11–13) occur at or close to a wavelength of about 580 nanometers which is in the wavelength region for yellow. At maximum reflectance the print density of the reproduction (i.e., the density of the print on the copy) will be at a minimum. Therefore, the Kodak 150, IBM II and Xerox 4000 copiers will print down on yellow, making the print on the copy very faint or light.

The maximum reflectance for the Xerox 3100, on the other hand, occurs in the region of 482 nanometers to 507 nanometers (blue-green). For a color in such a wavelength region the Xerox 3100 will print down, but to a lesser extent as compared with the other copiers at their maximum reflectances.

The system spectral responses shown in the drawing are not indicative of the proportion of present day copying machines which print up on yellow. Instead, it was found that most of the copiers in use today print up on yellow.

According to one dual color embodiment of this invention, stock paper to be used for the document is printed or otherwise produced by applying a colored image, such as a printed text, on a background of contrasting color. Advantageously, the yellow is selected for the background and has a dominant reflected light wavelength (i.e., maximum reflectance value) of approximately 580 nanometers. A suitable ink for printing the yellow background is Day-Glo Arc Yellow 5-77-16 litho ink manufactured by Coates Brothers, Inc. of Midsomer, Norton, England.

The color for the image is selected to have a dominant reflected light wavelength which is less than that of the yellow background. For this embodiment, the image color is preferably turquoise having a dominant reflected light wavelength lying between 465 nanometers and 530 nanometers. Such a selection of background and image colors affords a high degree of visual contrast on the original for easy readability. A suitable ink for printing the colored image is Permanent Turquoise LR19 manufactured by the previously mentioned company, Coates Brothers, Inc.

When a document having such a turquoise image imprinted on a yellow background (about 580 nanometers) is copied on a Xerox 3100 copier or on other types of similarly responsive copying machines, the yellow background will print up and the image will print down on the resultant copy. In other words, the reproduction print density resulting from the yellow background will be relatively strong while the reproduction print density resulting from the turquoise image will be relatively weak or faint. More specifically, the background print density on the resultant copy will be considerably greater or stronger than the image print density on the copy as evidenced by curve 11. On the resultant copy the image will therefore disappear or fade into the darker background and will only be faintly discernable on the copy. Accordingly, the combination of the print-up and print-down effect of background and image, respectively, reduces the contrast on the copy sufficiently to inhibit or prevent production of readable or intelligible copy.

To defeat a larger group of copying machines, different parts or portions of the image are printed or otherwise produced on the original in two different colors on a background of a third color, the third or background color being the yellow disclosed for the preceding dual color embodiment. The two image colors are so selected that one has a dominant reflective wavelength which is greater than the dominant wavelength of the yellow background, while the other has a dominant reflected wavelength which is less than that of the yellow background.

The image color having the greater wavelength advantageously is red-orange having a dominant reflected wavelength of about 625 nanometers. One suitable ink for imprinting this red-orange image color on the yellow background of the original is Day Glow Fire Orange 55-77-14 litho ink manufactured by the previously mentioned company, Coates Brothers.

The image color having the lower wavelength may in the spectrum range extending from light green having a dominant reflected wavelength of about 550 nanometers to yellow-green having a dominant wavelength range of about 555 to about 565 nanometers. Preferably the image color having the lower wavelength is yellow-green having a dominant wavelength of about 560 or 565 nanometers. One example of a suitable ink for the yellow-green image color is Coates Brothers Pea Green LS13.

For books or other text material arranged in successive paragraphs, alternate paragraphs may advantageously be printed in the two different image colors, namely red-orange and yellow-green. Considering a page of text material having four paragraphs, for example, the first and third paragraphs may be printed in red-orange. The second and fourth paragraphs will then be printed in yellow-green. Of course, the alternate coloring of paragraphs may be reversed, using the yellow-green to print the odd numbered paragraphs and the red-orange to print the even numbered paragraphs. Accordingly, roughly one-half of the text on a given page or sheet will be printed in red-orange and the remainder of the text on the sheet will be printed in yellow-green. An example of coloring alternate paragraphs in the two different image colors on the yellow background follows:

PROPOSED TEXT ON YELLOW PAPER

Paragraph I—Printed in Red-Orange

The systematic arrangement of parallels and meridians on a plane or flat surface is the framework upon which a map is constructed.

Paragraph II—Printed in Yellow-Green

By projecting the Earth's grid onto a tangent cylinder, we can achieve a series of parallels and meridians at right angles to one another.

Paragraph III—Printed in Red-Orange

The scale of a map is the relationship it has with the area it represents. It usually is determined by measuring the distance between two places on the map and relating this to the distance between two places on the map.

Paragraph IV—Printed in Yellow-Green

On world maps where the scale varies greatly from one latitude to another, a varying graphic scale is employed.

When the foregoing triple colored text example is copied on a Xerox 2100 machine, the red-orange paragraphs will print up in relation to the print density of the yellow background, but the yellow-green will print down in relation to the print density of the background. On the copy, therefore, the reproduction of the red-orange paragraphs will have a print density which is greater than that for the yellow background, but the reproduction of the yellow-green paragraphs will have a print density which is less than that resulting from the yellow background. As a result, the red-orange paragraphs will be readable on the copy, but the yellow-green paragraphs will disappear or face into the denser, dirty background on the copy, thus making every other paragraph unreadable or unintelligible to effectively obscure the information in the text.

When the foregoing triple colored text example is printed on such copying machines as the Xerox 4000, the IBM II or the Kodak 150, the background will be very light on the copy and the red-orange paragraphs will print up relatively strongly on such background. The yellow-green paragraphs, however, will print up only slightly in relation to the background print density of the copy, thus making the print density of the yellow-green paragraphs relatively light or faint on the copy. On the copy, therefore, the contrast between the background and the reproduction of the yellow-green paragraphs will be very slight, thereby making such reproduction difficult to read.

When the foregoing triple color text example is copied on various copies using a zinc oxide photoconductor, the yellow background and yellow-green paragraphs will reproduce or print up strongly on the copy, but the red-orange paragraphs will reproduce very faintly, thus resulting in the loss of intelligible contrast between the reproduction of the red-orange paragraphs and the reproduction of the yellow background.

From the foregoing it is evident that the triple color anti-copying system described above will economically defeat a much larger group of different types of office copying machines as compared with the dual color embodiment. The effectiveness of the triple color anti-copying system to defeat a wide variety of office copying machines resides not only in the selection of colors, but also in the selection of subject matter to be printed in each color. Thus, the image portions to be printed in the two different colors are so selected that non-reproduction or unintelligible reproduction of part, but not all of the image nevertheless renders the overall image at least generally if not entirely incomprehensible as a whole. Taking the preceding example of the text, for instance, the parts of the reproduced text which may still be intelligible on the copy are not sufficient to convey the overall meaning of the text.

According to a further dual color embodiment of this invention, contrasting background and image colors are so selected that they print up to approximately the same relative print density level on such copying machines as the Kodak Ektaprint 150, the IBM II and the Xerox 4000. In this embodiment, the background color of the original is one having a dominant wavelength or maximum reflectance value of about 650 nanometers, and the image color of the original is one having a dominant wavelength or maximum reflectance value of about 450 nanometers. In general, a turquoise or cyan image on a red tint or magenta background meet these dominant wavelength specifications.

Suitable links for the image color are manufactured by the previously mentioned company, Coates Brothers and include Permanent Turquoise LR19, Cyan LR41, and such offset inks as Process Cyan MR39 and Turquoise MR37. Suitable inks or colors for the background are marketed by Howard Smith Papers, Ltd. and include pink, cerise and salmon.

From the drawing it will be noted that the 650 nm dominant wavelength for the background color is considerably higher than the wavelength band containing the maximum reflectance values for the response curves 10, 11 and 13 and lies in a region where curves 10, 11 and 12 are nearly flat (i.e., zero slope) or approach a flat configuration. The 450 nm dominant wavelength for the image color is considerably lower than the small wavelength band containing maximum reflectance values for curves 10, 11 and 13. At this lower end of the illustrated spectrum, the 450 nm wavelength lies in a region where curves 10, 11 and 13 are also nearly flat or approach a flat configuration on the lower side of the dip. More importantly, for each of the response curves 10, 11 and 13, the two densities at the 450 nm and 650 nm wavelengths are very close together and are for practical purposes approximately equal.

By using such an image and background color combination on the original, the reproduction print density of the image and background will be about equal on the copy when the original is reproduced on such copiers as the Kodak 150, the IBM II and the Xerox 4000 as well as any other copiers having corresponding or similar system responses. The contrast will therefore be lost or greatly reduced on the copy to make the image unreadable or unintelligible.

For the Xerox 3100 and other copiers having system responses similar to curve 11 it will be noted that the print density at or about at 650 nanometers is significantly greater than the print density at or about at 450 nanometers. By using an image color having the lower dominant wavelength of about 450 nanometers and a background having a dominant wavelength of about 650 nanometers, the image will fade into the background on a copy made from a Xerox 3100 machine or other copier having a system response similar to curve 11. As a result, the foregoing coloring combination will impair the reproduction on such copying machines.

To further widen the different types of copiers which can be defeated with each of the three coloring schemes described above, the background color ink is advantageously printed in a variety of tints, such as 30% dot structure, 60% dot structure and finally 100% solid. Such tints may be printed on white paper. The percentages of dot structures signify the proportion of the sum of the areas of the dots to the overall area containing the dots. The advantage of using tints is that the selected color, upon copying, reproduces stronger as black, thus increasing the background density on the copy as compared with the original and hence resulting in a significant decrease between the up-printing background and the down-printing image.

For each of the coloring systems described above the original document (such as white paper) may be prepared by first printing the background color on the paper and thereafter printing the colored image on the colored background.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An anti-copying method of preparing an original, image-bearing paper document to inhibit or prevent intelligible reproduction of the image on the original document with xerographic and electrostatic copying machines, comprising the steps of providing said document with a yellow background, printing a first pre-selected portion of said image on said background in a first pre-selected color having a dominant wavelength which is greater than that of said yellow background, and printing the remainder of said image in a second pre-selected color having a dominant wavelength which is less than that of said yellow background.

2. An anti-copying method of preparing an original, image-bearing paper document to inhibit or prevent intelligible reproduction of the image on the original document with xerographic and electrostatic copying machines, comprising the steps of providing said document with a yellow background, printing a first pre-selected portion of said image on said background in a first pre-selected color having a dominant wavelength which is greater than that of said yellow background, and printing a second pre-selected portion of said image in a second pre-selected color having a dominant wavelength which is less than that of said yellow background, said first and second pre-selected portions being selected in such a way that failure to intelligibly reproduce either one of said first and second portions renders the image as a whole at least generally incomprehensible.

3. The anti-copying method defined in claim 2 wherein said first color is red-orange.

4. The anti-copying method defined in claim 2 or 5 wherein said second color is yellow-green.

5. The anti-copying system defined in claim 2 or 5 wherein said second color has a dominant wavelength in the range extending from about 550 nanometers to about 565 namometers.

6. The anti-copying method defined in claim 2 wherein said first color is red-orange having a dominant wavelength of about 625 nanometers, and wherein said second color is yellow-green having a dominant wavelength in the range from about 555 nanometers to about 565 nanometers.

7. The anti-copying method defined in claim 6 wherein said yellow background has a dominant wavelength of about 580 nanometers.

8. The anti-copying method defined in claim 2 wherein said image is a readable text having a plurality of paragraphs, a first pre-selected group of said paragraphs being printed in said first color, and a second pre-selected group of said paragraphs being printed in said second color.

9. The anti-copying method defined in claim 2 wherein said image is a text having a plurality of paragraphs, alternate paragraphs of said text being printed in said first and second colors, respectively.

10. The anti-copying method defined in claim 8 or 9 wherein said first color is red-orange having a dominant wavelength of about 625 nanometers, and wherein said second color is yellow-green having a dominant wavelength in a range extending from about 555 nanometers to about 565 nanometers.

11. The anti-copying method defined in claim 8 or 9 wherein said first color is red-orange having a dominant wavelength of about 625 nanometers, wherein said second color is yellow-green having a dominant wavelength in the range extending from about 555 nanometers to about 565 nanometers, and wherein said yellow background has a dominant wavelength of about 580 nanometers.

12. The anti-copying method defined in claim 8 or 9 wherein said first color is red-orange, and wherein said second color is yellow-green.

13. The anti-copying system defined in claim 2 wherein said background is a yellow-tint.

14. The anti-copying method defined in claim 2 wherein the selection of said first and second colors on said yellow-background operates to effectively defeat copying on first and second types of copying machines, and wherein each of the copying machines of said first type has a maximum reflectance (λmax) occuring at a wavelength which is at or near the dominant wavelength of said yellow background and which is greater than the wavelength at which maximum reflectance occurs for each copying machine of said second type; said first and second colors being so selected that the wavelengths at which maximum reflectance occurs for said first and second types of copying machines are closer to the dominant wavelength of said second color than to the dominant wavelength of said first color.

15. The anti-copying method defined in claim 14 wherein the dominant wavelength of said second color lies between the wavelength region where maximum reflectance occurs for said first type of copying machine and the wavelength region where maximum reflectance occurs for said second type of copying machine.

16. The anti-copying method defined in claim 15 wherein said second color has a dominant wavelength in the range extending from about 550 nanometers to about 565 nanometers.

* * * * *